(12) United States Patent
Liu et al.

(10) Patent No.: US 7,469,027 B2
(45) Date of Patent: Dec. 23, 2008

(54) SYMBOL TIMING SEARCH ALGORITHM

(75) Inventors: Weixiao Liu, Charlottesville, VA (US); Aaron Reel Bouillet, Noblesville, IN (US); Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 425 days.

(21) Appl. No.: 10/511,640

(22) Filed: Oct. 18, 2004

(65) Prior Publication Data

US 2005/0254611 A1     Nov. 17, 2005

Related U.S. Application Data

(60) Provisional application No. 60/374,031, filed on Apr. 19, 2002.

(51) Int. Cl.
*H04L 7/00* (2006.01)
(52) U.S. Cl. ...................................................... 375/355
(58) Field of Classification Search ................ 375/326, 375/324, 322, 316, 355
See application file for complete search history.

(56) References Cited

U.S. PATENT DOCUMENTS

| | | | |
|---|---|---|---|
| 4,617,587 A * | 10/1986 | Shanley, II | 348/505 |
| 6,072,842 A * | 6/2000 | Janesch et al. | 375/326 |
| 6,175,600 B1 * | 1/2001 | Guillemain et al. | 375/326 |
| 6,266,380 B1 * | 7/2001 | Wang | 375/319 |
| 6,282,249 B1 | 8/2001 | Tomesen et al. | |

FOREIGN PATENT DOCUMENTS

EP    1146709    10/2001

OTHER PUBLICATIONS

Search Report Dated Jul. 19, 2003.
Kibum Kim et al., "A Symbol Timing Recovery Using the Segment Sync Data for The Digital HDTV GA VSB System", IEEE, vol. 42, No. 3, Aug. 1996, pp. 651-656, XP011083501.
Supplementary European Search Report dated Apr. 23, 2007.

* cited by examiner

*Primary Examiner*—Kevin M Burd
(74) *Attorney, Agent, or Firm*—Joseph J. Laks; Paul P. Kiel; Joseph J. Opalach

(57) ABSTRACT

A system is described for establishing timing synchronism between a local receiver symbol clock and a transmitter symbol clock. A prescribed number of offset values are calculated for desired symbol timing range, the offset values being grouped substantially symmetrically about a central offset value. Each of the preselected offset values are tested to see if symbol timing recovery lock can be achieved by starting at the central offset value and gradually moving away from such value. Finally, two timing detection algorithms are used and switched between the two algorithms is carried out as desired to maximize the possibility of STR lock.

13 Claims, 2 Drawing Sheets

System

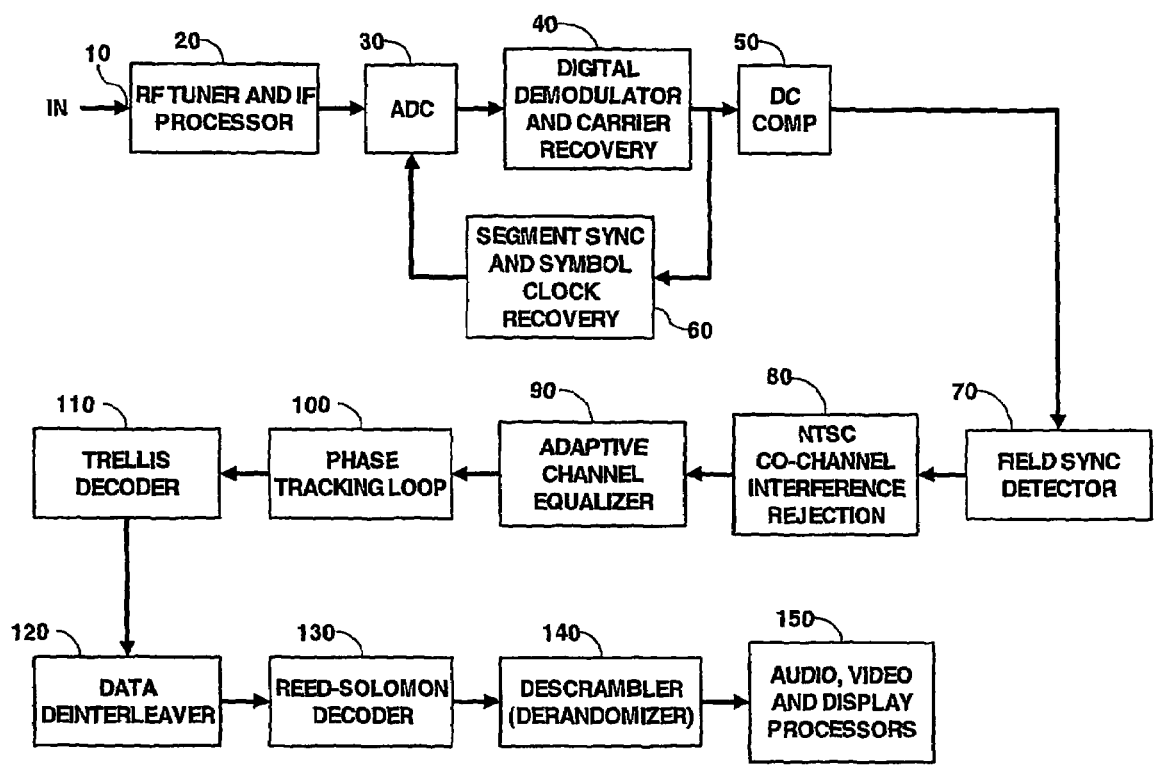
Fig. 1 – System

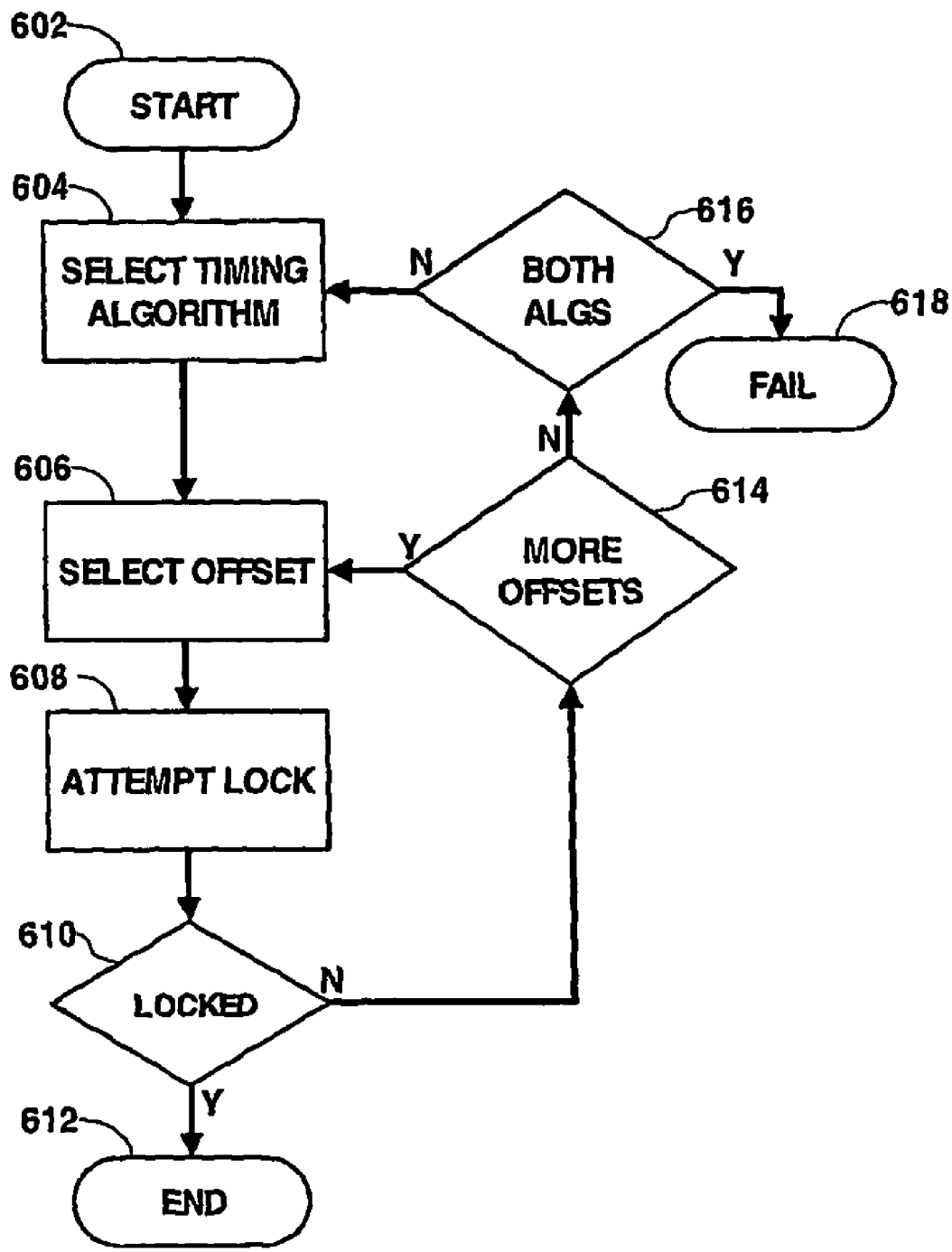
Fig. 2 - Flowchart

SYMBOL TIMING SEARCH ALGORITHM

This application claims the benefit, under 35 U.S.C. § 365 of International Application PCT/US03/11627, filed Apr. 15, 2003, which was published in accordance with PCT Article 21(2) on Oct. 30, 2003 in English and which claims the benefit of U.S. Provisional Patent Application No. 60/374,031, filed Apr. 19, 2002.

BACKGROUND

1. Field of the Invention

The present invention relates to a symbol timing recovery method and apparatus in a television receiver. More specifically, the present invention relates to a symbol timing recovery method apparatus useful in a high definition digital television receiver.

2. Discussion of the Related Art

Any terrestrial digital TV system must perform a number of functions, and overcome a number of problems, in transmitting signals to a receiver. For example, the United States has adopted the Advanced Television System Committee (ATSC) System using eight level vestigial sideband (8-VSB) as its digital television modulation standard. In this system, data representing the television program is transmitted as a stream of symbols, each symbol representing three data bits. These symbols are generated at a specified nominal frequency.

The recovery of data from modulated signals containing digital information in symbol stream form usually requires three functions at a receiver: timing recovery for symbol synchronization, carrier recovery (frequency demodulation to baseband) and channel equalization. The present invention deals specifically with a method and apparatus for more reliable and faster acquisition of symbol timing recovery (STR) over a wider range of STR offset frequencies.

The symbol timing recovery is a process by which a receiver symbol clock (timebase) is synchronized to the transmitter symbol clock. It permits a received signal to be sampled at optimum points in time to reduce slicing errors associated with decision-directed processing of received symbol values. It is therefore an important purpose of the present invention to provide a timing recovery loop for obtaining symbol synchronization. In order to lock the receiver symbol sampling frequency to the transmitted symbol frequency, the symbol frequency must be acquired, estimated and tracked so that samples can be taken at the correct rate and locations in time. For example, though the system symbol rate can be specified to be 20 megahertz (MHz), the respective frequencies of the oscillators in both the transmitter and the receiver may drift with time and thus the actual symbol frequency differentiate from the specified symbol frequency. The difference between the actual symbol frequency of the received signal and the specified symbol frequency is termed 'offset' in the remainder of this application.

In a known embodiment of a symbol timing recovery circuit, a phase locked loop (PLL) in the receiver generates the symbol clock in synchronism with the received signal. The PLL includes a loop integrator which controls the frequency of a voltage controlled oscillator. A phase comparator, comparing the respective phases of the received signal and the output signal of the voltage controlled oscillator, provides a control signal to the loop integrator, all in a known manner. When a new signal is to be received, the output of the loop integrator must be adjusted such that the frequency of the voltage controlled oscillator is matched to the symbol rate of the new signal, a process termed acquisition.

The PLL must be able to lock to a range of symbol frequency values in order to receive signals from different transmitters each having their own transmitter clock. As described above, the symbol frequency of the received signal will often be offset from the specified symbol frequency. Equivalently, the term offset may refer to the difference between the value of the loop integrator signal which would condition the loop oscillator to generate a signal locked to the symbols in the received signal and the value of the loop integrator signal which would condition the loop oscillator to generate a signal locked to symbols at the specified frequency.

There are several problems involved with achieving appropriate symbol timing recovery in the receiver. For example, it may take a long time for the symbol timing recovery circuit to acquire a "lock" on a channel if the starting point of the symbol timing recovery (STR) loop integrator (e.g. the loop integrator output signal for the previous signal) is far away from the eventual locked value for the new signal. The problem becomes even more serious when a narrow STR loop bandwidth is utilized in order to insure reliable acquisition. Indeed, if the STR starting offset is too far away from the locked value, STR loop lock may not be reliably achieved at all. Also, under moderate to strong ghost conditions, symbol timing lock is more reliably achieved when the starting offset is close to the final offset.

SUMMARY OF THE INVENTION

The present invention relates to a method for establishing timing synchronism between a transmitter symbol clock and a symbol clock in a receiver for receiving a signal formatted as a sequence of symbols at a symbol frequency and subject to exhibiting a symbol timing offset. The method includes steps of calculating a preselected number of offset values for a desired symbol timing recovery (STR) range. The offset values are grouped substantially symmetrically about a central offset value. Each of the preselected offset values is tested to see if symbol timing recovery lock can be achieved by starting at the central value and gradually moving away from the central value. Finally, two timing detection algorithms are used to maximized the possibility of STR lock.

A further embodiment incorporating principles of the present invention provides a processor for establishing timing synchronism between a transmitter symbol clock and a receiver symbol clock in a receiver for receiving a signal comprising a sequence of symbols at a symbol frequency and subject to exhibiting symbol frequency offset. This embodiment includes means for calculating a preselected number of offset values for a desired symbol timing recovery (STR) range, the offset values being grouped substantially symmetrically about a central offset value. Means are provided for testing each of the preselected offset values to see if symbol timing recovery lock can be achieved by starting at the central offset value and gradually moving away from such central offset value. Also included are means for using two detection algorithms for such testing as well as means for switching between the two algorithms to maximize the possibility of STR lock.

BRIEF DESCRIPTION OF THE DRAWINGS

FIG. 1 is a block diagram of a VSB receiver incorporating the principles of the present invention; and FIG. 2 is a flow diagram illustrating the acquisition method according to principles of the present invention.

DETAILED DESCRIPTION

Referring to the drawings, FIG. 1 is a block diagram of a VSB receiver incorporating the principles of the present invention. A terrestrial broadcast high definition television (HDTV) analog input signal (IN) is received by an antenna (not illustrated). The received signal is a carrier suppressed 8-VSB modulated signal as proposed by the advanced television standards committee (ATSC) television digital standard dated Sep. 16, 1995 adopted by the United States and incorporated herein by reference. Such a VSB signal is represented by a one-dimensional data symbol constellation wherein only one axis contains quantized data to be recovered by the receiver. As noted above, the received signal represents of a stream of data symbols in 8-VSB format, each symbol representing three data bits of the digital television signal. These symbol representative signals occur at a symbol frequency, which may vary from the nominally specified symbol frequency.

The received signal is applied to an input terminal 10 of a network 20 which includes RF tuning circuits and an IF processor. The IF processor includes a double conversion tuner for producing an IF passband output signal. The network 20 also includes the appropriate automatic gain control (AGC) circuits. The output signal of the network 20 is an IF passband output signal. This signal is applied to an analog-to-digital converter (ADC) 30 which produces an oversampled digital data stream. The ADC 30 oversamples the input 10.76 megasymbols/second VSB symbol data stream at a 21.52 MHz sampling clock rate, which is twice the received symbol rate. This provides an oversampled 21.52 megasamples/second digital data stream with two samples per symbol. The use of such two sample per symbol processing rather than one sample per symbol processing produces advantageous operation of subsequent signal processing functions: such as are associated with the subsequent DC compensation unit 50; and symbol phase detectors, as will be described in more detail below.

The remainder of the circuitry illustrated in FIG. 1 is implemented in the digital domain, rather than the analog domain. Such circuitry may be implemented as dedicated hardware circuitry. However, that circuitry may also be implemented as a digital signal processor arranged to execute a software program to provide the required processing functions, all in a known manner.

The digital data stream from the ADC 30 is demodulated to baseband by applying the data stream to a network 40 which is an all digital demodulator and carrier recovery network. The network 40 carries out this function by utilizing an all digital phase lock loop (PLL) responsive to a small reference pilot carrier in the received VSB data stream. The unit 40 produces an output I-phase demodulated symbol data stream.

Associated with the ADC network 30 and the demodulator 40 is a segment sync and symbol clock recovery network 60. The symbol clock recovery function operates to detect the time locations of the symbols in the input signal. A sample clock is then generated in synchronism with the received symbol stream. As described above, the sample clock is generated at twice the symbol frequency and in synchronism with the received symbols, resulting in two samples per symbol. This sample clock is coupled to the ADC 30.

When a new channel is tuned, symbol synchronization must be acquired. This process will be described in more detail below. Once acquired, symbol synchronization must then be maintained, or tracked. The HDTV television signal is transmitted as successive frames, each frame containing two fields, each field containing 313 segments, each segment containing 832 symbols. Each field begins with a field synchronization segment, and each segment, including the field synchronization segments, begins with a four symbol synchronization sequence, all of which have the same fixed value. Network 60 detects the repetitive sync components at the start of each segment in the received data. Segment synchronization signals are supplied (not shown to simplify the figure) to other processing blocks. The time locations of the segment synchronization signals are also detected and used to maintain a properly phased 21.52 MHz sample clock which is used to control the data stream symbol sampling by the ADC 30, all in a known manner.

Once circuit 60 acquires a lock on the channel so that the receiver clock is synchronized with the transmitter clock, the VSB receiver is tuned to the appropriate channel, and can function in an appropriate manner. The output of the digital demodulator and carrier recovery circuit 40 is applied to the DC compensation circuit 50, which compensates for the presence of the pilot tone, described above. The output of the DC compensation circuit 50 is applied to a field sync detector 70 and an NTSC co-channel interference rejection circuit 80. The output of circuit 80 is applied to an adaptive channel equalizer 90 which corrects channel distortions.

However phase noise can randomly rotate the symbol constellation so that the output of the equalizer 90 is applied to a phase tracking loop 100 which removes the residual phase and gain noise in the output signal from the equalizer 90. This includes phase noise which has not been removed by the preceding carrier recovery network 40 in response to the pilot signal.

The phase corrected signal output from the phase tracking loop 100 is then trellis decoded by the unit 110 deinterleaved by unit 120, Reed-Solomon error corrected by unit 130 and descrambled or derandomized by unit 140. Afterwards the decoded data stream is subjected to the audio, video and display processing by the unit 150.

The tuner and IF processor unit 20, the field sync detector 70, the equalizer 90, the phase tracking loop 100, the trellis decoder 110, the deinterleaver 120, the Reed-Solomon decoder 130 and the descrambler 140 may employ circuits of the type described in the Grand Alliance HDTV System specification dated Apr. 14, 1994. Circuits for performing the functions of the analog-to-digital converter 30, digital demodulation and carrier recovery 40 and DC compensation 50 are also well known.

One skilled in the art will understand from the above description that the segment sync signals are used to track the symbol timing. Because the segment signals are a four symbol sequence of a known fixed value, to detect segment sync signals the sample clock supplied to the ADC 30 must already be in synchronism with the symbol timing of the received signal. This is not the case when a new signal is received. Thus, symbol timing must be acquired by a different method that is used to track the symbol timing. That is, when a new channel is tuned, the symbol timing of the newly received signal must be detected, and the sample clock supplied to the ADC 30 must be phased properly to acquire the samples in the newly received signal.

Two algorithms are known which can detect the phase of symbols in a symbol stream relative to the sample clock without requiring symbol synchronization. The Mueller and Muller and the Gardner algorithms may be utilized in carrying out the acquisition process of the present invention. Both of these algorithms are well known. The Mueller and Muller algorithm is described in the IEEE Transactions on Communications, May, 1976, pages 516-531 and is incorporated herein by reference. The Gardner algorithm is described in the IEEE Transactions on Communications, Vol. Com-34, no. 5, May, 1986 pages 423-428 and is also incorporated herein by reference.

The Mueller and Muller algorithm is based on one sample per symbol but is decision-directed. The Gardner Algorithm is not decision-directed but generally requires two samples per symbol, one sample of which coincides with the symbol time location. Each of the Mueller and Muller algorithms and the Gardner algorithms has various strengths and weaknesses and neither actually works better than the other at all times. If only one algorithm is used, it will not necessarily operation in all the cases that the symbol timing recovery (STR) must potentially capable of dealing with. The STR timing detector acquisition algorithm of circuit 60 is arranged so that the detector will switch on the fly between the two different symbol timing algorithms to maximize the possibility of STR lock in a manner described in more detail below.

As described above, the actual symbol frequency may vary, or be offset, from the nominal specified symbol frequency over a range of acceptable symbol frequencies. Furthermore, it is possible that the symbol frequency of a preceding signal is offset toward one end of the range, while the symbol frequency of the newly received signal is offset toward the other end of the range. As described above, in this situation, it may take a long time to acquire the new symbol frequency, or in the worst case, the symbol clock recovery circuit 60 may never acquire the symbol frequency of the new signal.

In accordance with principles of the present invention, the STR symbol frequency offset in the circuit 60 is set during the acquisition phase to different values chosen from the range of offsets that the STR is likely to traverse. In a preferred embodiment of the present invention the STR offset range is specified to be ±1 kHz. This range is partitioned into nine points which corresponds to offsets of 0, ±200 Hz, ±400 Hz, ±600 Hz, and ±800 Hz from the nominal symbol frequency. Also in accordance with principles of the present invention, in order to quickly and reliably establish timing synchronism between the receiver symbol clock and the transmitter symbol clock, the present invention utilizes the two timing detection algorithms described above.

FIG. 2 is a flow diagram illustrating the acquisition method according to principles of the present invention. The search algorithm illustrated in FIG. 2 starts at block 602. In block 604, one of the two timing detection algorithms described above is selected. In block 606, for the selected timing algorithm, one of the nine pre-calculated offsets described above is used to generate a sample clock signal for the ADC 30. In block 608, starting at that pre-calculated offset, an attempt is made to lock to the newly received signal. In block 610, a check is made to determine if the lock attempt was successful. If so, then the acquisition method ends in block 612. Otherwise, a check is made in block 614 to determine of other pre-calculated offset values are still to be tried. If so, then the next pre-calculated offset value is selected in block 606 and another attempt to lock is made in block 608. If all the pre-calculated offset values have been tried, then in block 616, a check is made to determine of both timing algorithms have been tried. If not, then the other timing algorithm is tried in block 604 and all the pre-calculated offset values are tried for that timing algorithm. If both timing algorithms have been tried for all pre-calculated offset values and no lock has been achieved, then failure is indicated in block 618. Alternatively, the acquisition method illustrated in FIG. 2 may be repeated indefinitely.

As described above, the symbol clock recovery circuit 60 may be implemented as dedicated hardware adapted to implement the function described in FIG. 2. Alternatively, the symbol clock recovery circuit 60 may include a programmable digital signal processor or microprocessor operating under control of a program which conditions the processor to perform the method illustrated in FIG. 2. In addition, the symbol timing recovery circuit 60 may include a combination of a programmable processor and dedicated hardware designed to perform selected function under the control of the DSP, all in a known manner.

Under typical conditions, the frequency offset between the nominal symbol frequency and the actual symbol frequency of a received signal is close to zero, or in other words, near the center of the range of symbol frequencies over which the symbol clock recovery circuit 60 can achieve lock. Occasionally, however, the actual symbol frequency of a received signal is towards the extreme of the specified lock range due to transmitter and/or receiver reference clock errors. Thus, the acquisition method starts in block 606 by selecting an offset at the center or zero kHz in the above noted example and gradually moves outward: i.e. ±200 Hz, then ±400 Hz, then ±600 Hz, and then ±800 Hz, toward the extreme of the lock range. This algorithm arrangement allows a more reliable and faster STR acquisition over a wider range of STR offset frequencies, and in the presence of moderate to strong ghost conditions.

In the segment sync and symbol clock recovery circuit 60, as noted above, carrier frequency offsets have been precalculated to cover the anticipated entire range that the STR is likely to traverse. This will guarantee a more reliable acquisition. Since the STR in the circuit 60 has less distance to traverse when starting with a searched offset value it takes less time for the acquisition to be achieved, and provides additional reliability of acquisition.

In accordance with the principles of the present invention the utilization of the Mueller and Muller algorithm in combination with the Gardner algorithm as well as the arrangement described above for calculating a preselected number of offset values for a desired symbol acquisition range assures quick and accurate "locking" of the receiver clock with the transmitter clock. More reliable acquisition is achieved since as noted above the STR integrator has less distance to traverse when starting with a searched offset value.

While the present invention has been described with respect to a particular method and a particular illustrative example it is evident that the principles of the present invention may be embodied in other methods and arrangements without departing from the scope of the present invention as defined by the following claims. For example, the Gardner and/or Mueller and Muller symbol timing algorithms may be modified for more accurate acquisition of the particular VSB signal specified for the HDTV transmission system. Alternatively, more symbol timing algorithms than the two discussed above, may be included by including them in the method illustrated in FIG. 2. In addition, the range of symbol frequencies may be wider than the 1 kHz in the illustrated embodiment, and that range may be divided into more than the nine points in the illustrated embodiment. Furthermore, one skilled in the art will understand that the modulation method is not germane to the present invention. That is, the present invention may also be used with other digital modulation schemes, such as quadrature amplitude modulation (QAM) and quadrature phase shift keyed (QPSK) modulation.

The invention claimed is:

1. A method for establishing timing synchronism between a transmitter symbol clock and a local symbol clock in a receiver for receiving a signal transmitted as a sequence of symbols at a symbol frequency and subject to exhibiting a symbol frequency offset, said method comprising the steps of:

calculating a preselected number of offset values for a desired symbol timing recovery range, said offset values being grouped substantially symmetrically about a central offset value;

testing each of said preselected offset values to see if symbol timing recovery lock can be achieved by starting at said central offset value and gradually moving away from said central offset value wherein the received signal carries a high definition television (HDTV) signal transmitted as a modulated vestigial sideband (VSB) signal formatted as a one-dimensional data constellation of symbols representing digital image data.

2. A method as claimed in claim 1 wherein said desired symbol timing recovery range is plus or minus 1 kHz.

3. A method as claimed in claim 2 wherein said preselected number of offset values is nine.

4. A method as claimed in claim 3 wherein said nine offset values are 0 Hz; plus or minus 200 Hz; plus or minus 400 Hz; plus or minus 600 Hz; and plus or minus 800 Hz.

5. A method as claimed in claim 1 further comprising steps of repeating the testing step for each of a plurality of symbol timing recovery algorithms.

6. A method as claimed in claim 5 wherein said plurality of symbol timing recovery algorithms comprises the Mueller and Muller algorithm and the Gardner algorithm.

7. A processor for establishing timing synchronism between a transmitter symbol clock and a local receiver symbol clock in a receiver for receiving a signal comprising a sequence of symbols at a symbol frequency and subject to exhibiting symbol frequency offset comprising:

means for calculating a preselected number of offset values for a desired symbol timing recovery range, said offset values being grouped substantially symmetrically about a central offset value;

means for testing each of said preselected offset values to see if symbol timing recovery lock can be achieved by starting at said central offset value and gradually moving away from said central offset value wherein the received signal comprises a high definition television (HDTV) signal transmitted as a one-dimensional data constellation of symbols representing digital image data.

8. A processor as claimed in claim 7 wherein said desired symbol timing recovery range is plus or minus 1 KHz.

9. A processor as claimed in claim 8 wherein said preselected number of offset values is nine.

10. A processor as claimed in claim 9 wherein said nine offset values are 0 Hz; plus or minus 200 Hz; plus or minus 400 Hz; plus or minus 600 Hz; and plus or minus 800 Hz.

11. A processor as claimed in claim 10 further comprising:

means for using a plurality of symbol timing detection algorithms for said testing; and means for switching between said algorithms as desired to maximize the possibility of STR lock.

12. A processor as claimed in claim 11 wherein the switching means comprises means for selecting one of the plurality of detection algorithms before testing each of said preselected offset values.

13. A processor as claimed in claim 11 wherein said plurality of timing detection algorithms comprise the Mueller and Muller algorithm and the Gardner algorithm.

* * * * *